US012172171B2

(12) United States Patent
Crooks

(10) Patent No.: US 12,172,171 B2
(45) Date of Patent: Dec. 24, 2024

(54) QUICK CHANGE CASSETTE SHREDDER

(71) Applicant: World Tek Industries, Romulus, MI (US)

(72) Inventor: Michael Crooks, Gibraltar, MI (US)

( * ) Notice: Subject to any disclaimer, the term of this patent is extended or adjusted under 35 U.S.C. 154(b) by 0 days.

(21) Appl. No.: 17/553,935

(22) Filed: Dec. 17, 2021

(65) Prior Publication Data

US 2023/0191419 A1 Jun. 22, 2023

(51) Int. Cl.
*B02C 18/14* (2006.01)
*B02C 18/16* (2006.01)
*B02C 18/18* (2006.01)

(52) U.S. Cl.
CPC .......... *B02C 18/142* (2013.01); *B02C 18/182* (2013.01); *B02C 2018/162* (2013.01); *B02C 2018/168* (2013.01)

(58) Field of Classification Search
CPC ................ B02C 18/162; B02C 18/182; B02C 2018/162
USPC ........................................................ 241/37.5
See application file for complete search history.

(56) References Cited

U.S. PATENT DOCUMENTS 781,530 A * 1/1905 Jespersen ....... A47B 2210/0059 312/334.8
3,578,252 A * 5/1971 Brewer .................. B02C 18/06 241/141
4,738,404 A * 4/1988 Mitchell ............... B02C 18/148 241/285.2
5,285,973 A 2/1994 Goforth et al.
5,494,229 A 2/1996 Rokos et al.
5,799,887 A * 9/1998 Kroger .................... B02C 18/16 241/236
8,807,468 B2 8/2014 Neunzert
8,882,011 B2 11/2014 Romanovich et al.
11,084,042 B2 8/2021 Burhorst et al.
2011/0272515 A1* 11/2011 Bohlefeld ............... B02C 18/16 241/199.12
2013/0015280 A1* 1/2013 Tamaki ................. B02C 18/182 241/294
2014/0061347 A1* 3/2014 Chang ................. B02C 18/0007 241/282.1
2017/0274384 A1 9/2017 Pohling et al.
(Continued)

FOREIGN PATENT DOCUMENTS

DE 4315671 A1 * 11/1994 ........... B02C 18/142
DE 4337157 A1 * 5/1995 ......... B02C 18/0007
(Continued)

OTHER PUBLICATIONS

International Search Report and Written Opinion for PCT/US2022/053019 (12 pages). Apr. 26, 2023.

*Primary Examiner* — Debra M Sullivan
*Assistant Examiner* — Matthew Stephens
(74) *Attorney, Agent, or Firm* — Fishman Stewart PLLC

(57) ABSTRACT

A shredding module of a shredding apparatus is disclosed. The shredding module includes a shredder cassette receiver and a shredder cassette received within the shredder cassette receiver. The shredding cassette includes two shredding shafts arranged in parallel and rotatable about respective rotation axes, and two sets of fingers that cooperate with the two shredding shafts to shred material. The shredder cassette is slidably movable in an axial direction of the respective rotation axes into and out of the shredder cassette receiver.

20 Claims, 15 Drawing Sheets

(56) References Cited

U.S. PATENT DOCUMENTS

| | | | | |
|---|---|---|---|---|
| 2019/0366352 | A1* | 12/2019 | Burhorst | B02C 18/0092 241/294 |
| 2020/0316609 | A1 | 10/2020 | Lindner et al. | |
| 2021/0069722 | A1 | 3/2021 | Kjaersgaard et al. | |

FOREIGN PATENT DOCUMENTS

| | | | | |
|---|---|---|---|---|
| DE | 4315671 | C2 | 5/1997 | |
| DE | 102016111508 | A1 | 12/2017 | |
| EP | 1593435 | A1 | 11/2005 | |
| EP | 3453460 | A1 | 3/2019 | |
| EP | 3912727 | A1 * | 11/2021 | B02C 18/142 |
| KR | 100759485 | B1 | 10/2007 | |
| WO | 89001364 | A1 | 2/1989 | |
| WO | 09109795 | A1 | 9/2009 | |
| WO | 20251950 | A1 | 12/2020 | |

* cited by examiner

QUICK CHANGE CASSETTE SHREDDER

TECHNICAL FIELD

The present disclosure relates generally to a shredder apparatus, and more particularly to a quick change shredder with a cassette design.

BACKGROUND

Industrial shredding machines are utilized in a wide array of industries such as metal parts and scrap, consumer and industrial waste recycling, construction debris processing, etc. to break-up a variety of materials into smaller constituents. Such operation may be performed in connection with incineration where the shredded materials are transported to furnaces for recycling.

Generally, shredders are a single structure including a cutting or shredding assembly, an upper supply housing for supplying materials to the shredding assembly, a lower discharge duct for collecting and discharging comminuted materials, and a supporting structure fixed to the shredding assembly. The shredding assembly is driven by a drive assembly (e.g., motors, gears, bearings) designed to drive rotation of the cutters/shredders. One type of shredding assembly includes two shredding shafts with transversely extending shredding knives that mesh with one or more sets of transversely extending fixed counter knives or fingers. The fingers prevent the material (e.g., scrap metal) from bypassing the shredding assembly, so that the material to be shredded is forced through the shredding knives between the shredding shafts.

However, a wide variance exists in the expected lifespans of the machine components. For example, certain high wear components such as the shredding knives may become degraded prior to degradation of other components, such as the fingers or drive assembly. It is of outmost importance to reduce the down-time of shredder machines as much as possible, considering that they operate almost constantly, e.g., for 20 hours of 24 hours. To access internal components of the shredding assembly, many shredder machines required disassembly of the upper supply housing and/or the lower discharge duct together with the supporting structures from the shredding assembly, making repairs time consuming and costly.

A technique employed to reduce degradation of components, and particularly the shredding knives, has been to lubricate the rotating parts by pouring oil onto the shredding knives as the material to be shredded is loaded into the shredding assembly. However, such a technique leads to significant waste and the potential of igniting the furnace with the oil-soaked shredded material.

Overcoming these concerns would be desirable. Thus, there is a need for an improved shredder apparatus.

BRIEF DESCRIPTION OF THE DRAWINGS

While the claims are not limited to a specific illustration, an appreciation of the various aspects is best gained through a discussion of various examples thereof. Although the drawings represent illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrates are described in detail by referring to the drawings as follows:

DETAILED DESCRIPTION

Figure 1:
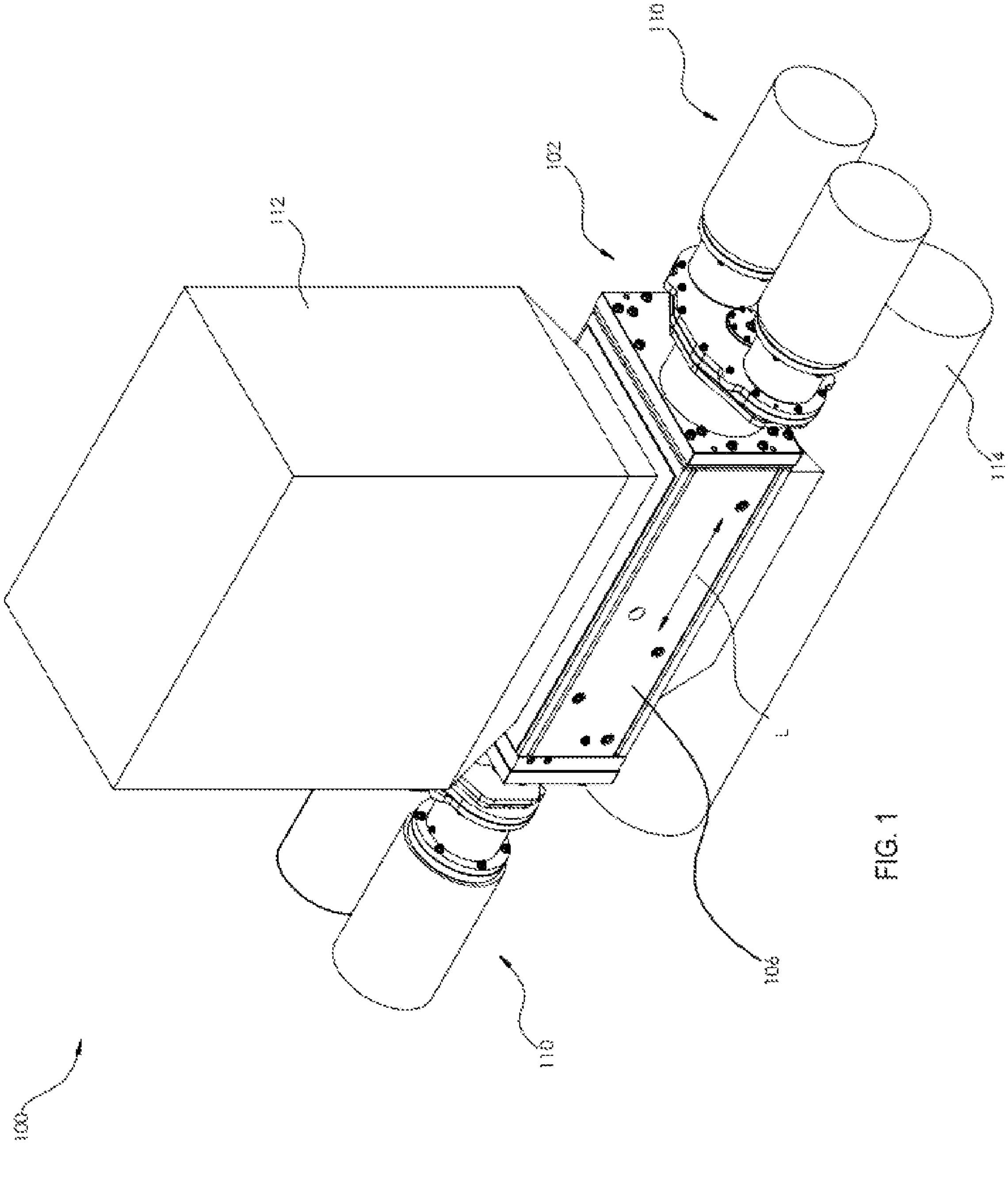
FIG. 1 illustrates a perspective view of a shredder apparatus.

In the drawings, where like numerals and characters indicate like or corresponding parts throughout the several views, exemplary illustrates are shown in detail. The various features of the exemplary approaches illustrated and described with reference to any one of the figures may be combined with features illustrated in one or more other figures, as it will be understood that alternative illustrations that may not be explicitly illustrated or described may be able to be produced. The combinations of features illustrated provide representative approaches for typical applications. However, various combinations and modifications of the features consistent with the teachings of the present disclosure may be desired for particular applications or implementations.

The present disclosure relates to a shredding machine or shredding apparatus (hereafter shredding apparatus) with a quick change cassette design that allows components to be swapped out or serviced with less down time than conventional designs. The cassette design allows the shredder cassette to be removed and replaced without disturbing any of the upper supply housing, the lower discharge duct, or any of its supporting structure, which drastically reduces machine down time. The cassette design reduces machine down time for repairs substantially.

According to a first aspect, there is provided a shredding module of a shredding apparatus. The shredding module includes a shredder cassette receiver and a shredder cassette received within the shredder cassette receiver. The shredding cassette includes two shredding shafts arranged in parallel and rotatable about respective rotation axes, and two sets of fingers that cooperate with the two shredding shafts to shred material. The shredder cassette is slidably movable in an axial direction of the respective rotation axes into and out of the shredder cassette receiver. The cassette design reduces machine down time for repairs substantially. Further, the shredder cassette can be serviced off line and returned to the customer to be stored in standby ready to go.

Pursuant to an implementation, the shredding module includes a sliding mechanism to allow the axial sliding movement between the shredder cassette and the shredder cassette receiver. For example, the shredder cassette includes at least one guide track that interacts with at least one slide projection, e.g., at least one cam follower, disposed on the shredder cassette receiver, or vice versa. The term "cam follower" is meant to be interpreted broadly and encompass drawer slides including, but not limited to, a radially projecting pin, wheel or roller slides, bearing slides, a stud or pin follower, and roller followers. Thus, "slide projection" and "cam follower" may be used interchangeably. The guide track(s) may extend in an axial direction along a radially outer side of a housing of the shredder cassette, and the cam follower(s) may be disposed on a radially inner side of the shredder cassette receiver. The guide track(s) and cam follower(s) facilitate a smooth sliding motion of the shredder cassette relative to the shredder cassette receiver.

Additionally or alternatively, the shredder cassette receiver includes a bore and a safety pin arranged in the bore, wherein the safety pin engages into a groove on a radially outer side/surface of the shredder cassette to stop the shredder cassette at a predefined draw-out distance. Such a provision adds additional safety and reliability when removing the shredder cassette from the shredder cassette receiver.

The shredder cassette may include a front end plate and a rear end plate that rotatably mount the two shredding shafts. Pursuant to an implementation, the front end plate is larger in cross section than the rear end plate. The rear end plate is thereby allowed to be inserted into the shredder cassette receiver, with the front end plate engaging against an open end of the shredder cassette receiver when fully inserted.

At least one drive module may be operatively coupled to the shredding module to drive the shredding shafts. Pursuant to an implantation, two drive modules are provided on opposite longitudinal ends on the shredding module for driving the two shredding shafts independently to allow the speeds and direction to be controlled separately. The front end plate and/or the rear end plate may have positioning aids for mounting at least one of the drive modules relative to the shredder cassette.

The two sets of fingers may be detachably coupled to the shredder cassette, e.g., via screws or bolts. This provision adds a level of modularity to the shredding module. The two shredding shafts may each include a splined shaft and a plurality of disc-shaped shredding knives indexed at predefined increments along the splined shaft. Pursuant to an implantation, one or more of the plurality of disc-shaped shredding knives comprises an integrated spacer protruding in the axial direction. The integrated spacer may increase the strength of the shredding knives as well as improve tolerances and dimensional control with spacing.

According to a second aspect, there is provided a shredder apparatus including an upper supply housing, a lower discharge duct, and a shredding module including a shredder cassette and a shredder cassette receiver where the shredder cassette receiver is connected to the upper supply housing and the lower discharge duct. The shredder cassette is axially movable relative to the respective rotation axes of the shredding shafts into and out of the shredder cassette receiver while the shredder cassette receiver is connected to the upper supply housing and the lower discharge duct. As such, the shredder cassette can be removed and replaced without disturbing (e.g., removing) any of the upper supply housing and the lower discharge duct.

The shredder cassette may include a first end plate and a second end plate that mount a first longitudinal end and a second longitudinal end of the two shredding shafts, respectively, and two side walls that interconnect the first end plate and the second end plate. The first end plate and the second end plate may define semi-circular openings, and the shredder cassette may further include a first bearing block and a second bearing block defining corresponding semi-circular openings that are positioned above and aligned with the semi-circular openings of the first end plate and the second end plate.

The shredder cassette may include at least one guide track disposed on a radially outer side/surface of at least one of the two side walls that interacts with at least one cam follower disposed on the shredder cassette receiver. Additionally or alternatively, the shredder cassette receiver may include a bore and a safety pin arranged in the bore, wherein the safety pin engages into a groove on a radially outer side/surface of at least one of the two side walls of the shredder cassette to stop the shredder cassette at a predefined draw-out distance.

The shredder cassette may include a first set of fingers removably coupled to a first of the two side walls and interacting with one of the two shredding shafts, and a second set of fingers removably coupled to a second of the two side walls and interacting with the other of the two shredding shafts.

At least one of the two shredding shafts may include at least one shredding knife with an integrated spacer disposed at a hub of the at least one shredding knife. Additionally or alternatively, the two shredding shafts may comprise a splined hollow tube and a plurality of shredding knives clocked at predefined increments, e.g., 10 or 12 degree increments. Pursuant to an implementation, the splined hollow tube includes a radially projecting stop collar, and wherein the plurality of shredding knives are axially tensioned against the stop collar by a retaining ring.

Implementations of the disclosure may include combinations of the above-described features. Details of these and other aspects of the disclosure will be apparent from the following discussion of but one non-limiting example of a shredder apparatus comprising a quick change shredder cassette and/or an improved lubrication system.

Figure 2:
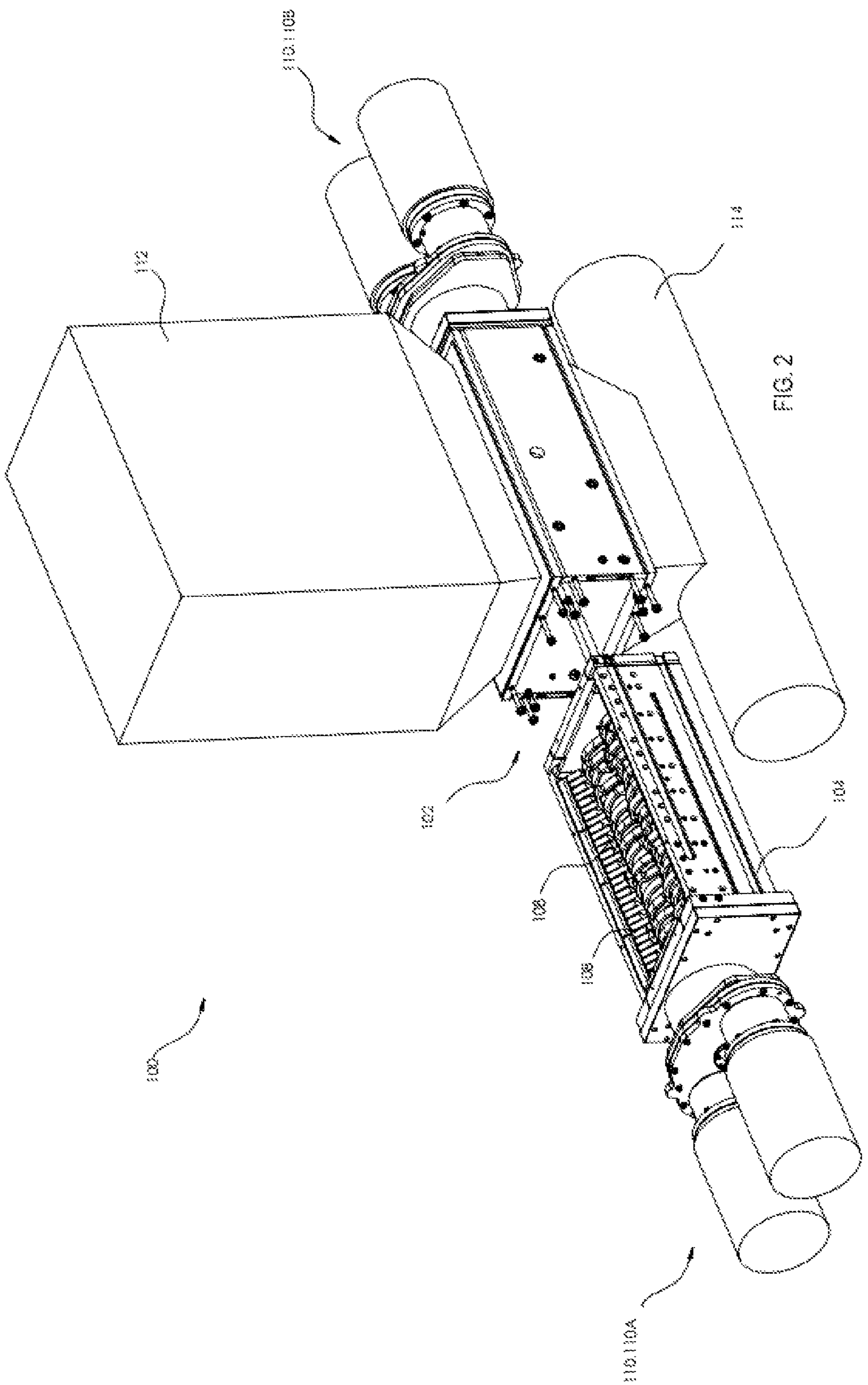
FIG. 2 illustrates a perspective view of the shredder apparatus of FIG. 1 with a shredder cassette thereof removed from a shredder cassette receiver.

Referring now to FIGS. 1 and 2, there is shown a shredder apparatus 100. The shredder apparatus 100 is shown in an assembled state in FIG. 1, and in a disassembled or drawn out state in FIG. 2. The shredder apparatus 100 is utilized to shred/cut waste material (not shown) such as metal parts and scrap on an industrial scale, which shredding material may then be transported to a furnace for incineration and recycling.

The shredding apparatus 100 is intended for stationary use and includes a stationary support structure or support frame (not shown), which may comprise a conventional table or bench with legs positioned on the ground. Other implementations of the shredding apparatus 100 may be mobile where the stationary frame may be replaced with some other supporting structure. In the illustrated example, the shredding apparatus 100 is positioned on the ground by a conventional stand or support legs (not shown). The shredding apparatus 100 includes a shredding module 102 comprising a shredder cassette 104 and a shredder cassette receiver 106. The shredding module 102, e.g., the shredder cassette 104 and the shredder cassette receiver 106, are shown with a rectangular shape, although other shapes are contemplated. The shredder cassette receiver 106 may form part of the support/stationary frame, or may be a separate component attached to the support/stationary frame. The shredder cassette 104 includes one or more cutting or shredding shafts 108 rotatably mounted therein, for shredding/cutting material such as metal scrap (e.g., aluminum scrap). In the illustrated example, the shredder cassette 104 includes two shredding shafts 108 arranged in parallel and rotatable about a respective rotation axis A. At least one drive module 110 is mounted to the shredding module 102 for driving the shredding shaft(s) 108.

The shredder apparatus 100 includes an upper supply housing 112 is mounted on top of the support frame (e.g., in relation to the ground) for supplying material to be shredded to the shredding module 102, and a lower discharge duct 114 mounted underneath the support frame for discharging and conveying shredded material. The upper supply housing 112 is connected to a top of the shredder cassette receiver 106 and the lower discharge duct 114 is connected to a bottom of the shredder cassette receiver 106. Pursuant to an example, the upper supply housing 112 and/or the lower discharge duct 114 are detachably connected to the shredder cassette receiver 106, so that they may be customized for each user and adapted to the waste material type. Pursuant to another example, the upper supply housing 112 and/or the lower supply duct 114 are integrally formed with the shredder cassette receiver 106 to reduce parts and assembly time.

As shown in FIG. 2, the shredder cassette 104 is movable translationally or draws out in a longitudinal direction L from the shredder cassette receiver 106 to allow quick change and service of parts with less down time than other designs. That is, the shredder cassette 104 is axially movable relative to the rotation axes A of the two shredding shafts 108 into and out of the shredder cassette receiver 106 while the shredder cassette receiver 106 is connected to the upper supply housing 112 and the lower discharge duct 114. The cassette design allows the shredder cassette 104 to be removed (e.g., pulled out longitudinally from the shredder cassette receiver 106) and replaced without disturbing any of the upper supply housing 112, the lower discharge duct 114 or any of its supporting structure, which drastically reduces machine down time. The modularity of the shredder cassette 104 allows the parts to be serviced off-line and returned to the customer and stored in standby.

Figure 3:
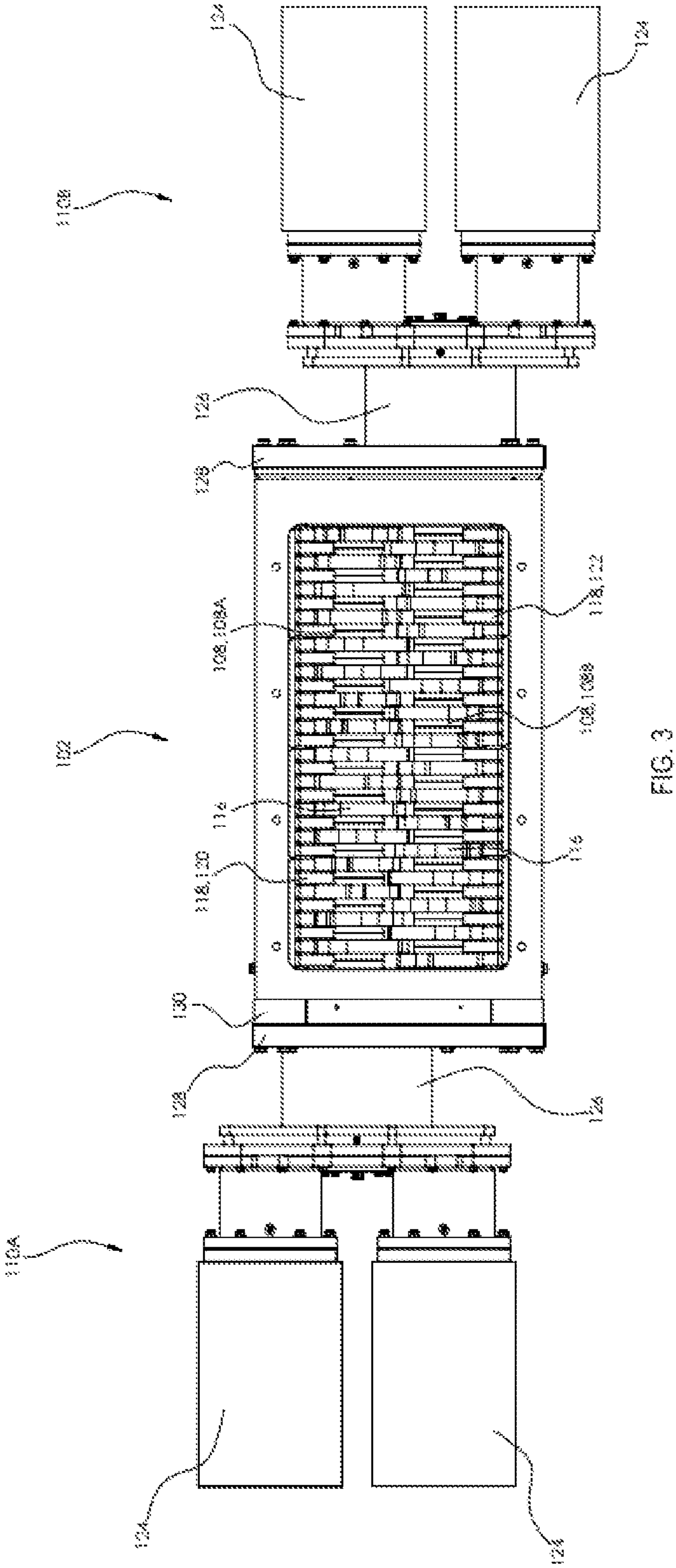
FIG. 3 illustrates a top view of a shredding module of the shredder apparatus of FIG. 1.
Figure 4:
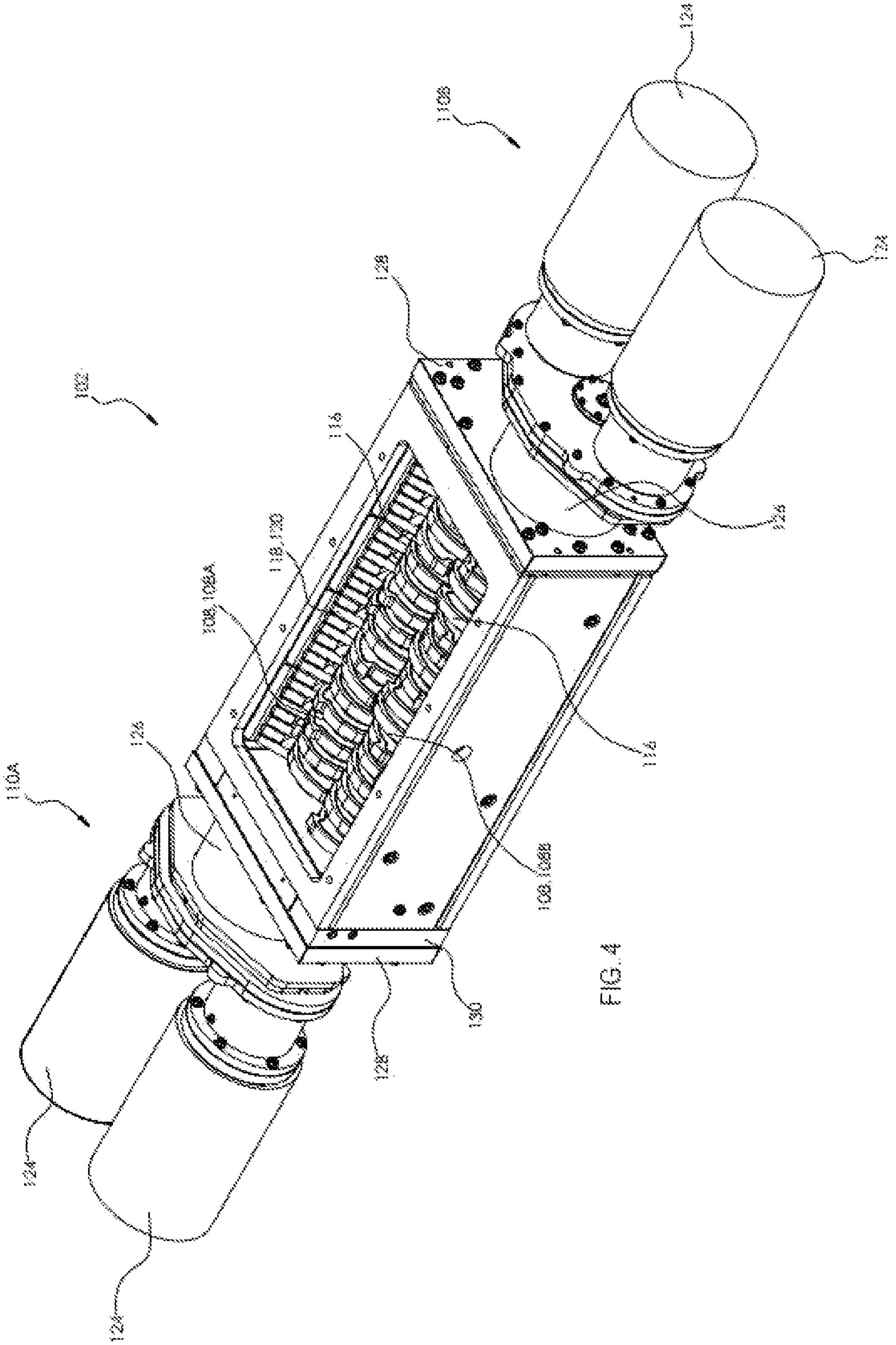
FIG. 4 illustrates a perspective view of the shredding module of FIG. 3.

With reference to FIGS. 3-4, the shredding module 102 is shown with the drive modules 110 attached thereto, without showing the upper supply housing 112, the lower discharge duct 114, and the support frame. The shredding module 102 includes two shredding shafts 108 arranged in parallel and rotatable about respective rotation axes A. The shredding shafts 108 comprise shredding knives 116 that interact with counter shredding knives or fingers 118, where a first set of fingers 120 are arranged to interact with a first shredding shaft 108A and a second set of fingers 122 are arranged to interact with a second shredding shaft 108B. The fingers 118 are structured and arranged to control the size of waste material to be shredded and stop the material from falling through the shredding module 102 or bypassing the shredding knives 116.

In the illustrated example, two drive modules 110A, 110B are positioned on opposite longitudinal ends of the shredding module 102 and operatively connected to the at least two shredder shafts 108 for driving the shredder shafts 108 independently to allow the speeds and direction to be controlled separately. During operation, the shredding shafts 108 rotate in opposite direction, toward each other, but may also be controlled to rotate away from each other or combinations thereof. A first or front drive module 110A is drivingly connected to the first shredding shaft 108A and a second or rear drive module 110B is drivingly connected to the second shredder shaft 108B. The drive module(s) 110A, 110B may comprise one or two motors 124 (e.g., hydraulic and/or electric) and a gearbox 126 that couples the motor(s) 124 to the associated shredding shaft 108. The drive module(s) 110A, 110B include a mounting plate 128 detachably coupled to (e.g., via screws/bolts) a longitudinal end of the shredder cassette 104 and/or the shredder cassette receiver 106.

Figure 5:
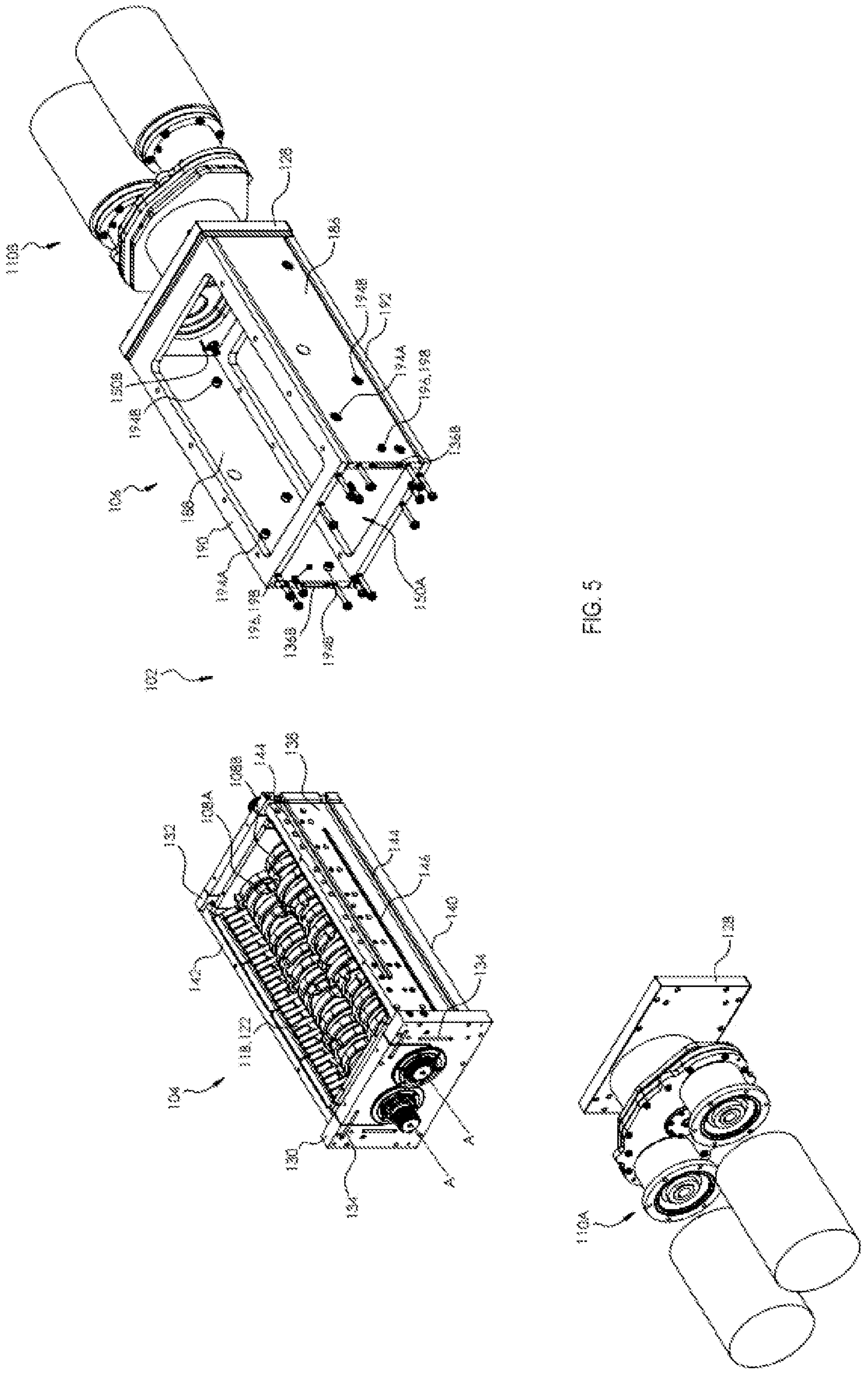
FIG. 5 illustrates a perspective view of the shredding module of FIG. 3 with the shredder cassette removed from the shredder cassette receiver.

With reference to FIG. 5, the first or front drive module 110A may be mounted with its mounting plate 128 to a first or front end plate 130 of the shredder cassette 104, while the second or rear drive module 110B may be mounted with its mounting plate 128 to the shredder cassette receiver 106. For example, bolts may be threaded through the mounting plate 128 of the front drive module 110A and the front end plate 130 and connected to the shredder cassette receiver 106, while the mounting plate 128 of the rear drive module 110B may be fastened (e.g., via bolts) bolted directly to the shredder cassette receiver 106 (and not the rear end plate 132). The provision of attaching the front drive module 110A to the shredder cassette 104 and the rear drive module 110B to the shredder cassette receiver 106 allows the shredder cassette 104 to be pulled out and inserted into the shredder cassette receiver 106 without having to detach the second or rear drive module 110B. Additionally, the shredder cassette 104 is permitted to be pulled out of the shredder cassette receiver 106 to provide access to the internal components (e.g., shredding shafts 108, fingers 118, etc.) for service or replacement without any need for disconnecting the drive modules 110 from the shredding module 102. For this purpose, separate bolts or screws (not shown) may be used to connect the mounting plate 128 of the front drive module 110A with the front end plate 130, so that the front drive module 110A remains attached to the shredder cassette 104 when the shredder cassette 104 is drawn out from the shredder cassette receiver 106.

To facilitate attaching/detaching the drive module(s) 110 from the shredding module 102, the shredder cassette 104 may have, on an outer face or surface of the first/front end plate 130, positioning aids 134 that mate with counter positioning aids (not shown) on an inner surface of the mounting plate 128 of the first/front drive module 110A. For example, the positioning aids 134 may comprise grooves or slots on the end plate 130 that mate with ridges or protrusions on the mounting plate 128, or vice versa. It is also contemplated that the shredder cassette receiver 106 and/or rear end plate 132 has positioning aids on its outer surface that mate with counter positioning aids disposed on an inner surface of the mounting plate 128 of the second/rear drive module 110B, to likewise facilitate assembly/disassembly efficiencies.

Figure 6:
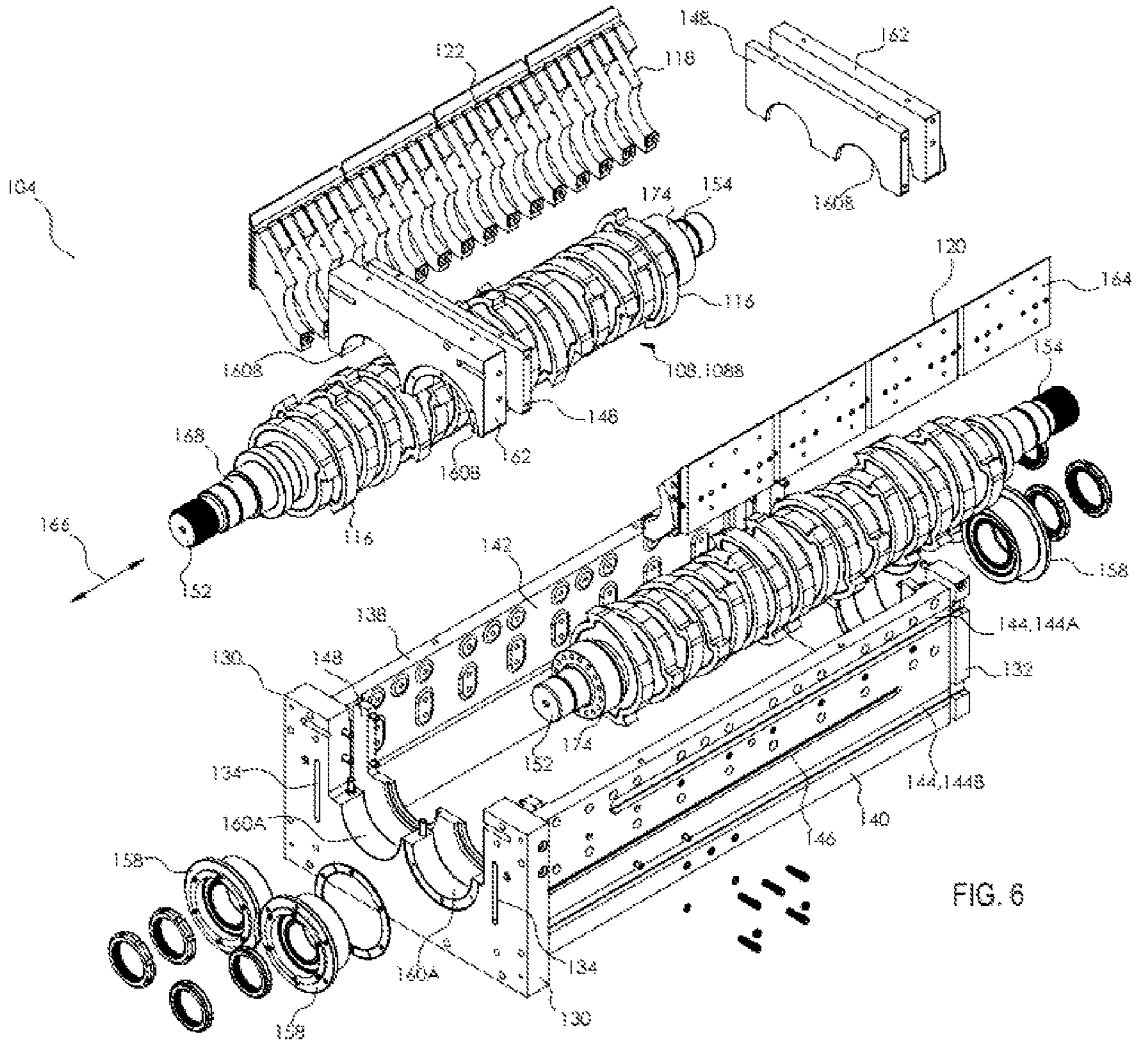
FIG. 6 illustrates an exploded view of the shredder cassette of FIG. 5.
Figure 7:
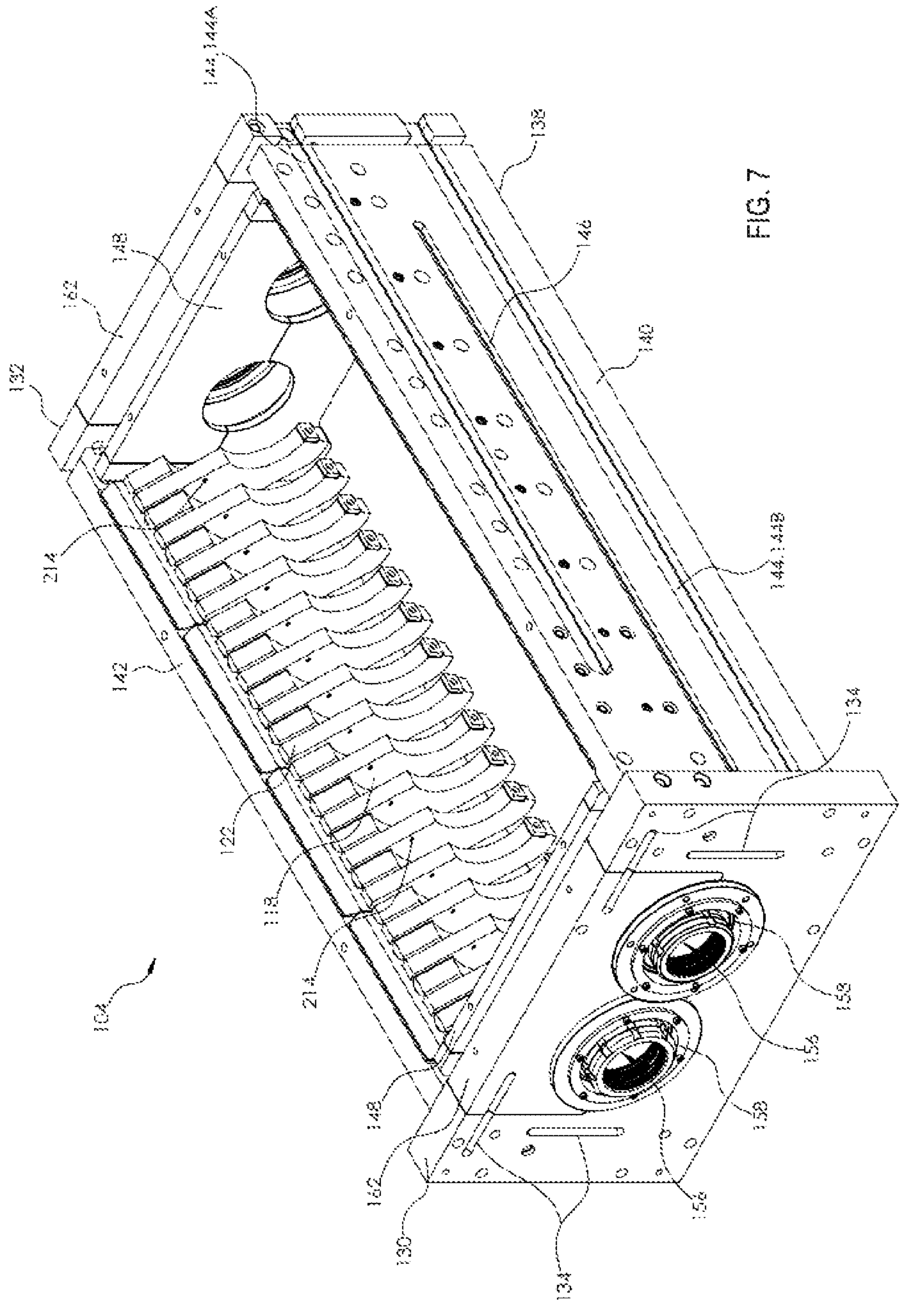
FIG. 7 illustrates a perspective view of the shredder cassette of FIG. 5 with the shredding shafts removed.

With reference to FIGS. 5-7, the shredder cassette 104 includes a cassette housing 138 comprising two longitudinally extending side walls 140, 142 and two end plates 130, 132, wherein the two shredding shafts 108 are arranged in parallel and rotatably mounted on the two end plates 130, 132 about the respective rotation axes A. The two side walls interconnect the first (front) end plate 130 and the second (rear) end plate 132, so that the shredder cassette 104 has an open top and bottom. The two side walls 140, 142 include, on a radially outer side/surface, at least one guide track 144 (e.g., groove) to facilitate inserting and pulling out the shredder cassette 104 from the shredder cassette receiver 106. In the illustrated example, the shredder cassette 104 has an upper guide track 144A and a lower guide track 144B on the radially outer side of the side walls 140, 142. The upper guide track 144A may have an axial length or extent shorter than that of the lower guide track 144B, as measured from the rear end plate 132, to act as a stop in the insertion direction. Additionally or alternatively, one or both side walls 140, 142 may include a safety groove 146 extending partially along the radially outer side/surface thereof from the front end plate 130 towards the rear end plate 132 to act as a safety stop when pulling out the shredder cassette 104 from the shredder cassette receiver 106, as discussed further below. The shredder cassette 104 may additionally include two inner end walls 148 arranged axially inwards of the two end plates 130, 132 for shielding the end plates 130, 132 from debris. The shredding shafts 108 penetrate through the inner end walls 148 and are supported by the two end plates 130, 132. The second end plate 132 may be designed smaller in cross section than the first end plate 130, so that the second (rear) end plate 132 can be inserted into the shredder cassette receiver 106 with the first (forward) end plate 130 engaging with its flange surface against an open end 150A of the shredder cassette receiver 106. The flange surface of the front end plate 130 may have a locking aid 136A (see FIG. 13) that engages with a counter-locking aid 136B disposed on the open end 150A of the shredder cassette receiver 106, to facilitate aligning and locking the shredder cassette 104 relative to the shredder cassette receiver 106 during a closing action.

The first end plate 130 and the second end plate 132 mount a first longitudinal end 152 and a second longitudinal end 154 of the two shredding shafts 108, respectively, via bearing openings 156. The bearing openings 156 receive bearings 158 on which the shredder shafts 108 rotate. Pursuant to an implementation, the first end plate 130 and the second end plate 132 define semi-circular openings 160A that receive first and second bearing blocks or inserts 162 defining corresponding counter semi-circular openings 160B that are positioned above and aligned with the semi-circular openings 160A of the first and second end plates 130, 132, wherein the semi-circular openings 160A and the counter semi-circular openings 160B together define the bearing openings 156. The first and second bearing blocks 162 can be inserted into and removed from engagement with the first and second end plates 130, 132, so that the shredder shafts 108 can be loaded from the top into the shredder cassette 104 to facilitate assembly/disassembly efficiencies. The two inner end walls 148, if provided, may likewise each comprise two components having semi-circular openings aligned with each other and axially aligned with the bearing openings 156, as shown in FIG. 6. Pursuant to another example, the first and second end plates 130, 132 may each be formed of a single, unitary piece of material that defines the bearing openings 156 and are removably attached (e.g., fastened) to the two side walls 140, 142.

The first set of fingers 120 are arranged between a first side wall 140 and the first shredding shaft 108A, and the second set of fingers 122 are arranged between a second side wall 142 and the second shredding shaft 108B. The first and second set of fingers 120, 122 are fastened to the associated side wall 140, 142, e.g., via screws, to facilitate removal and replacement should the fingers 118 become degraded or broken. However, it is also contemplated that the first and second set of fingers 120, 122 may be integrally connected (e.g., welded) to the associated side wall 140, 142. Each set of fingers 120, 122 includes a plurality of fingers 118 disposed on a base 164 and extending crosswise or transversely in relation to the shredding shafts 108 and are mutually spaced by openings in the axial direction 166. The individual fingers 118 (or scrapers) may be interchangeable and independently replaceable such that only a broken or degraded finger 118 need be serviced instead of removing the entire set to save on cost, such as by removing a bolt/screw securing the finger 118 to the base 164. Each set of fingers 120, 122 may be divided into groups comprising a number of fingers (e.g., 2, 3, or 4 fingers) associated with a common base 164 and detachably fastened to the side wall 140, 142, to facilitate replacing broken fingers 118 without having to remove the whole set of fingers 120, 122 during repair, thereby reducing downtime and costs associated with repair. In the example shown (see FIG. 6), each set of fingers 120, 122 includes four (4) groups of fingers 118 although it is contemplated that more or less groups may be present.

Figure 8:
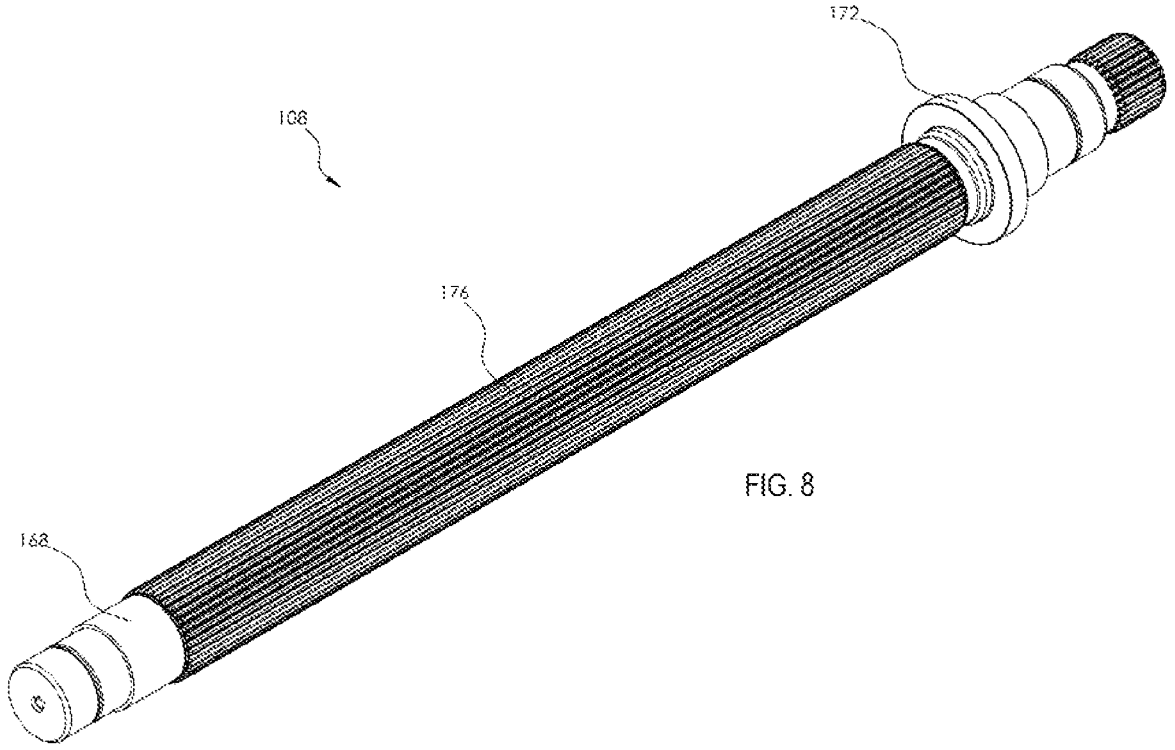
FIG. 8 illustrates a perspective view of a shredding shaft according to an example.
Figure 9:
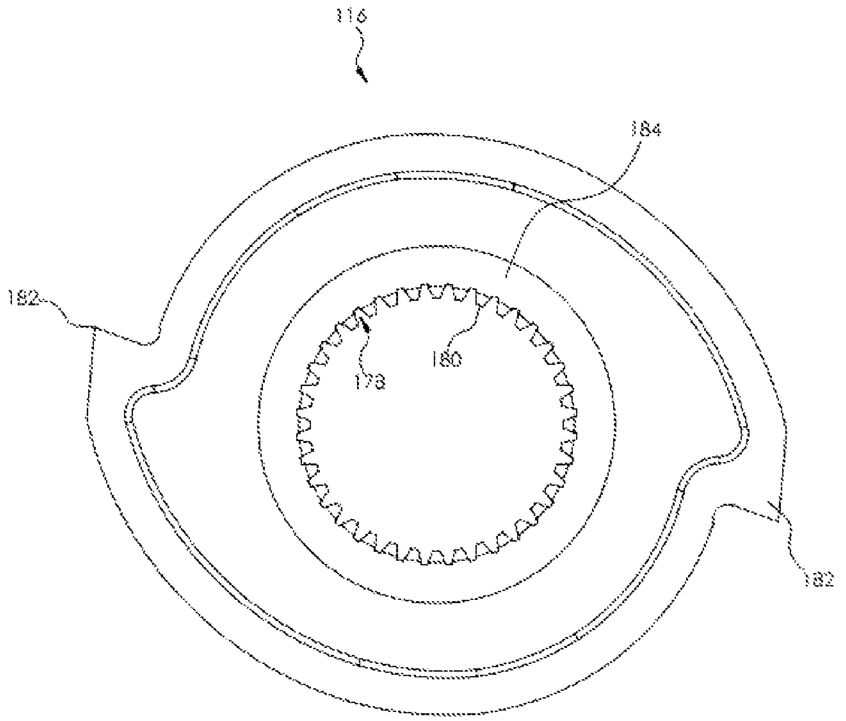
FIG. 9 illustrates a front view of a shredding knife according to an example.
Figure 11:
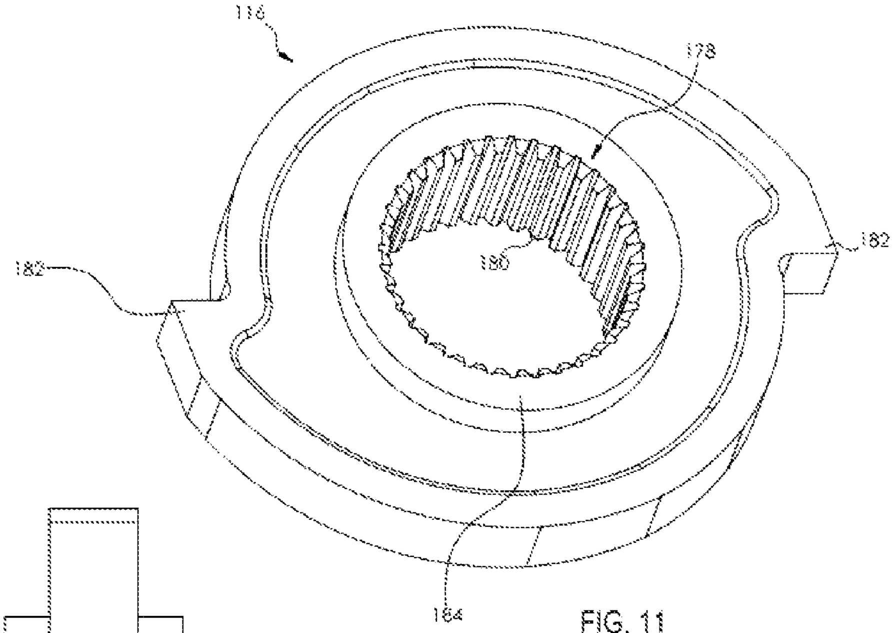
FIG. 11 illustrates a perspective view of the shredding knife of FIG. 9.
Figure 10:
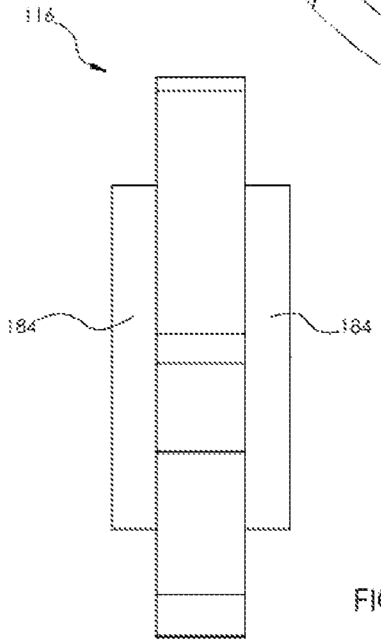
FIG. 10 illustrates a side view of the shredding knife of FIG. 9.

The shredding shafts 108 each comprise a rotatable shaft tube 168 and a set of disc-shaped shredding knives 116 mounted on the shaft tube 168 at mutually spaced intervals in the axial direction 166. The shredding knives 116 extend partly into the openings between the fingers 118. The shaft tube 168 includes a stop collar 172 at one end (see FIG. 8), so that the disc-shaped shredding knives 116 can be threaded or slid axially onto the shaft tube 168, and a retaining ring 174 at the other end for tensioning the shredding knives 116 in the axial direction 166 to provide improved dimensional control and tolerances. The shredding knives 116 may be clocked or indexed at predefined angular increments, e.g., 10, 12, or 15 degree increments, along the associated shredding shaft 108.

As shown in FIGS. 8-11, each shredding shaft 108 may comprise a splined shaft tube 168 with outer/external splines 176. The shredding knives 116 comprise a hub 178 with internal splines 180 that engage with the splines 176 of the shaft tube 168, and one or more blades 182 disposed at a radially outer region of the disc-shaped knife 116. The spline design allows one shredding knife 116 to fit all clocking requirements in the predefined increments (e.g., 10 degree increments), wherein the clocking or indexing is measured from the position of the blade 182 of mutually adjacent shredding knives 116. The shredding knives 116 may include an integrated spacer 184 disposed at the hub 178, protruding axially on one or both axial sides of the shredding knife 116. The integrated spacer 184 facilitates increasing spline engagement, thereby reducing tolerance stack up of the shredding knives 116, as well as increases the strength of the respective shredding knife 116. Additionally, the integrated spacer 184 renders a separate spacer component superfluous, thereby reducing parts and service time.

Figure 12:
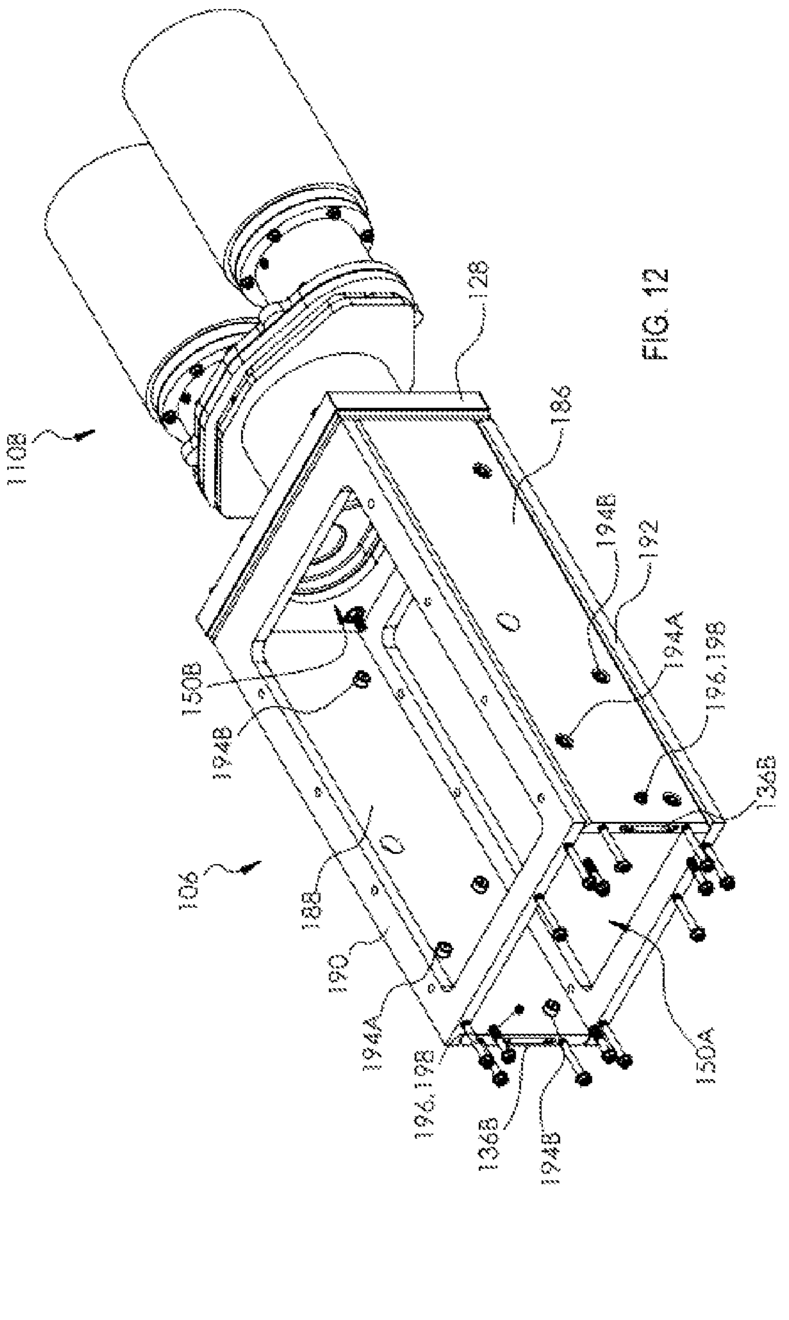
FIG. 12 illustrates a perspective view of the shredder cassette receiver of FIG. 5.
Figure 13:
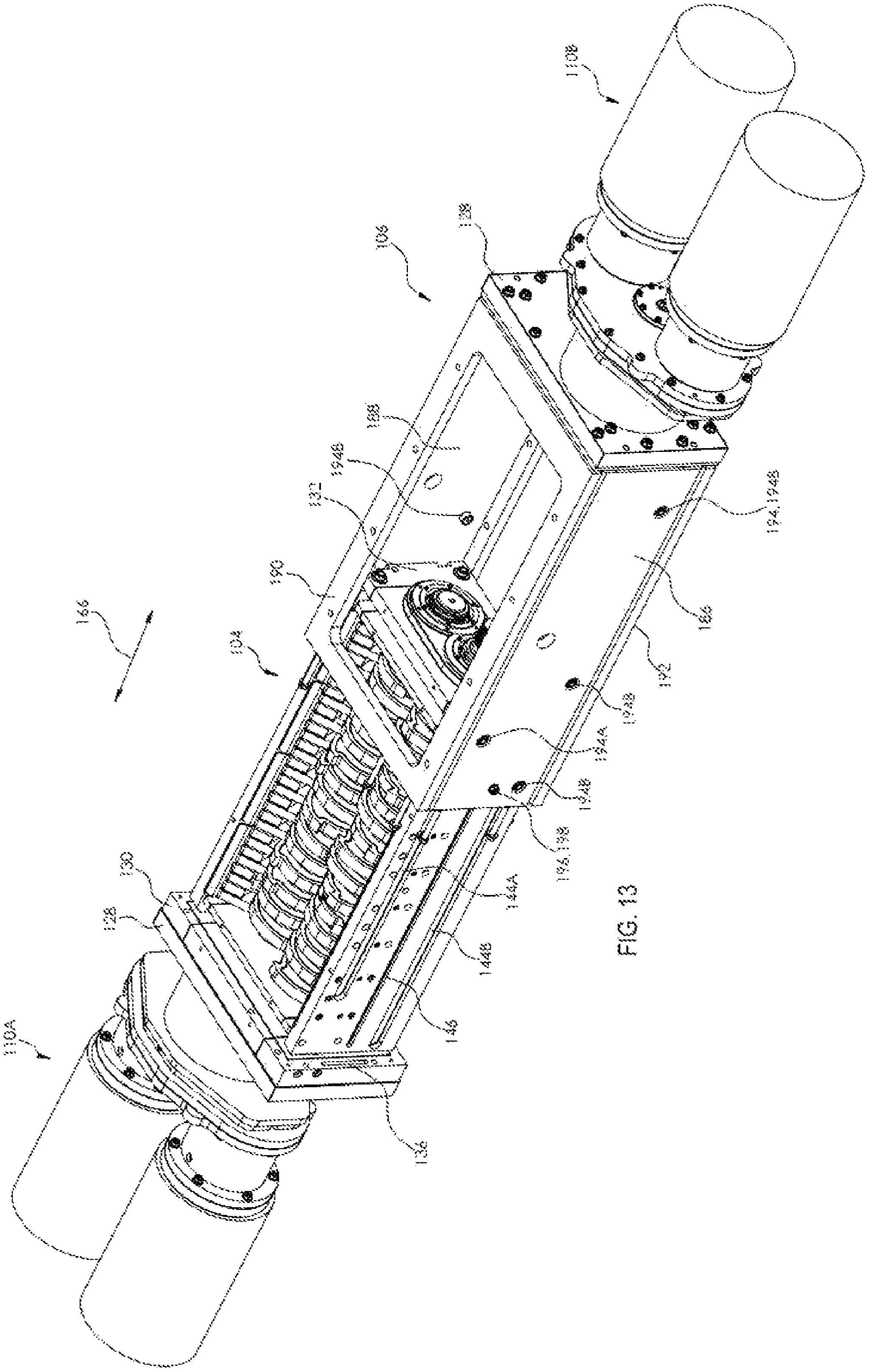
FIG. 13 illustrates a perspective view of the shredding module of FIG. 3 with the shredder cassette pulled out to the stops.

Referring to FIGS. 5, 12 and 13, the shredder cassette receiver 106 comprises a five-sided box structure with an open front end 150A and a closed rear end 150B, as well as an open top and bottom to allow material to be shredded to enter from the upper supply housing and exit to the lower discharge duct. The closed rear end 150B of the shredder cassette receiver 106 may be provided by an end wall or plate, or by the mounting plate 128 of the rear drive module 110B. The shredder cassette receiver 106 includes two side plates 186, 188 and top and bottom frames 190, 192 interconnecting the two side plates 186, 188, wherein the top and bottom frames 190, 192 define the open top and bottom of the shredder cassette receiver 106.

The two side plates 186, 188 include at least one slide projection 194, projecting radially inwards, that includes, but is not limited to, a pin, a wheel or roller slide, and a cam follower (hereafter cam follower 194) on a radially inner surface thereof that interacts with the at least one guide track 144 on the radially outer surface of the side walls 140, 142 of the shredder cassette 104. The cam follower 194 may comprise a stud or pin type follower, or a wheel or roller follower where a wheel is arranged on a radially projecting pin anchored to the shredder cassette receiver 106. The cam follower 194 engages into the guide track 144 (e.g., a race or groove on the side walls 140, 142) to facilitate the (axial) sliding movement between the shredder cassette 104 and the shredder cassette receiver 106. Although the following description refers to a cam follower 194, it will be appreciated that a simple pin/stud, wheel slide, or ball bearing slide may be used in place of the cam follower without departing from the scope of the disclosure.

Pursuant to the illustrated example, the two side plates 186, 188 may each include one or a plurality of upper cam followers 194A that engage with the respective upper guide track 144A of the two side walls 140, 142. The upper cam follower 194A, or the forward cam follower 194A if multiple are provided, is positioned at an axial location on the respective side plate 186, 188 that stops the shredder cassette 104 at a predefined insertion depth when it reaches the end of the upper guide track 144A, to aid in properly positioning the shredder cassette 104 in the shredder cassette receiver 106 in the assembled state. The two side plates 186, 188 may additionally each include one or a plurality of lower cam followers 194B that engage with the respective lower guide track 144B of the two side walls 140, 142 of the shredder cassette 104. The cam follower(s) 194 and guide track(s) 144 facilitate slidably moving the shredder cassette 104 in the axial direction 166 relative to the shredder cassette receiver 106. To stop the shredder cassette 104 from being removed entirely from the shredder cassette receiver 106 without first properly securing the shredder cassette 104 (e.g., via a harness or table), one or both side plates 186, 188 may have a bore 196 that receives a safety pin 198 (see also FIG. 2) projecting through the bore 196 radially inwards that engages into the safety groove 146 disposed on at least one of the side walls 140, 142. When the shredder cassette 104 is pulled out from the shredder cassette receiver 106, the safety pin 198 engages against an axial end of the safety groove 146 to stop the shredder cassette 104 at a predefined draw-out distance and from being removed any further until the safety pin 198 is removed.

With reference to FIGS. 2, 5, and 13, the shredder cassette 104 is slidably movable in an axial direction 166 of the respective rotation axes A into and out of the shredder cassette receiver 106 for servicing and assembling the shredder apparatus 100, while the shredder cassette receiver 106 is connected to the upper supply housing 112, the lower discharge duct 114, and the supporting frame. The shredder cassette 104 moves translationally relative to the shredder cassette receiver 106 through the interaction of the cam follower(s) 194 sliding along the guide track(s) 144, so that the shredder cassette 104 may be pulled or drawn out from the shredder cassette receiver 106 to be serviced and pushed in to its assembled state (see FIG. 1) for operation. To remove the shredder cassette 104 from the shredder cassette receiver 106, the user or repairman removes the bolts connecting the front end plate 130 and the mounting plate of 128 the front drive module 110A to the open end 150A of the shredder cassette receiver 106, and draws out the shredder cassette 104 from the shredder cassette receiver 106 until the safety pin 198 engages against the axial end stop of the safety groove 146 (see FIG. 13). Once the shredder cassette 104 is secured (e.g., via a harness or stand/table), the safety pin 198 is removed from the bore 196 and then the shredder cassette 104 is free to be disassembled and removed entirely from the shredder cassette receiver 106. The cassette designs facilitates increased shredder reliability and serviceability, which allows the user to service the shredder in much less time than current designs to save on time and money.

Figure 14:
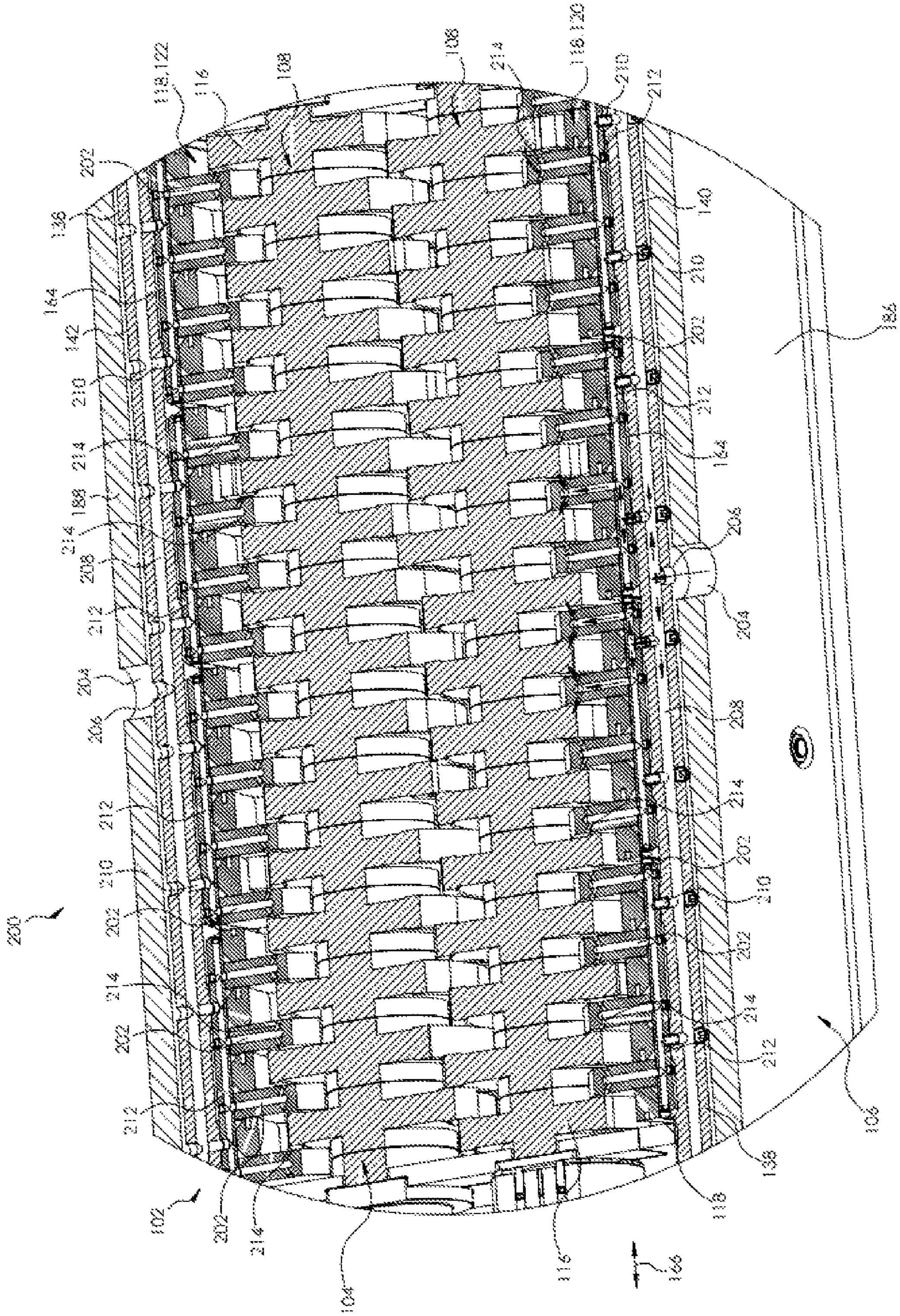
FIG. 14 illustrates a cross-sectional view of the shredding module of FIG. 3 showing a shredder lubrication system according to an example.

FIG. 14 illustrates another aspect of the present disclosure where a shredder lubrication system 200 is shown according to an example. The shredder lubrication system 200 provides for minimum quantity lube (MQL) on the shredding knives to improve shredder reliability and save on lubrication cost and waste.

FIG. 14 shows a cross-sectional view of the shredding module 102 of FIG. 3. Lubricant (shown generally by arrows) is supplied through the shredder cassette housing 138 to the knife 116 and finger 118 interface to help eliminate material galling and keep shredder components cool. Pursuant to the illustrated example, the first set of fingers 120 and/or the second set of fingers 122 include finger lubricating channels 202 for supplying lubricant to the shedding shafts 108.

The shredder cassette receiver 106 has a supply opening 204 in one or both side plates 184, 186 for the introduction of lubricant into the shredding module 102. The supply opening 204 may be connected to a hose (not shown) for a supply of lubricant. The lubricant may include air, oil, water, or a combination thereof (e.g., air over oil).

The shredder cassette 104 includes a supply inlet 206 in communication with the supply opening 204 of the shredder cassette receiver 106. The supply inlet 206 may be arranged in one or both side walls 140, 142 and aligned with the supply opening 204, to reduce flow resistance and back pressure. A lubricant supply channel 208 extends axially along the first and/or second set of fingers 120, 122 for supplying lubricant from the supply inlet 206 to the lubricating channels 202. The lubricant supply channel 208 may be formed in, e.g., bored or drilled, the side wall(s) 140, 142 of the cassette housing 138. Radially inwards of the lubricant supply channel 208, radial supply ports 210 may be provided in the side wall(s) 140, 142 to communicate lubricant from the lubricant supply channel 208 to the lubricating channels 202. The radial supply ports 210 are distributed axially in the side wall 140, 142 along the lubricant supply channel 208. The radial supply ports 210 accordingly penetrate a radially inner surface of the associated side wall 140, 142, and the supply inlet 206 penetrates a radially outer surface of the associated side wall 140, 142, with the lubricant supply channel 208 extending in the axial direction 166 between the radial supply ports 210 and the supply inlet 206. The supply inlet 206 may open into the lubricant supply channel 208 at a position axially offset from the radial supply ports 210 so that the incoming flow is split or diverted axially by the channel wall towards the front and rear of the shredder cassette 104 to facilitate a more uniform lubricant flow.

A lubricant supply manifold 212 may be disposed radially between the radial supply ports 210 and the lubricating channels 202. The lubricant supply manifold 212 extends axially along the associated set of fingers 120, 122 (e.g., parallel to the lubricant supply channel 208) and may be formed in the base 164 (e.g., a drilled or bored chamber in the base 164) or formed on the base 164 (e.g., as a groove on the radially outer side of the base 164). The lubricant supply manifold 212 may be continuous or discontinuous in the axial direction 166. For example, the lubricant supply manifold 212 may connect lubricating channels 202 of different groups of fingers 118 together (discontinuous), or may be used to connect lubricating channels 202 of the whole set of fingers 120, 122 together (continuous). The illustrated example of FIG. 14 shows a discontinuous lubricant supply manifold 212 wherein each lubricant supply manifold 212 is connected with four (4) lubricating channels 202 and two (2) radial supply ports 210, however it will be appreciated that the numbers may vary without departing from the scope of the disclosure.

The lubricating channels 202 extend in the radial direction in individual fingers 118 from the cassette housing 138 or respectively the lubricant supply manifold 212 towards the at least two shredding shafts 108. The lubricating channels 202 may extend in each finger 118, or may alternate fingers 118, depending on design and lubrication requirements. At a distal end of the finger 118, the lubricating channel 202 has at least one outlet opening 214 (see also FIG. 7) that opens into an axial side of the respective finger 118 at the knife/finger interface. In the illustrated example of FIG. 14, each lubricating channel 202 has two outlet openings 214 disposed on both or opposite axial sides of the associated finger 118. The outlet opening(s) 214 may extend transversely to (e.g., obliquely to) the lubricating channel 202, and thus transversely to the axial direction 166 and transversely to the radial direction.

During operation of the shredder lubrication system 200, a supply of lubricant (e.g., air, oil, water, or a combination thereof such as air over oil) is provided from the supply opening 204 in the shredder cassette receiver 106 to the supply inlet 206 in the cassette housing 138, enters the lubricant supply channel 208 and is distributed among the radial supply ports 210 to the lubricant supply manifold 212, where lubricant proceeds through the lubricating channels 202 and exits at the outlet openings 214 at the finger/knife interface to lubricate the shredding shafts 108. The lubricant is applied via the outlet openings 214 to the waste material (e.g., metal scrap) as it is shredded to reduce galling as well as lubricate and cool the shredding knives 116 and fingers 118. The lubricant may be replaced/supplied continuously (e.g., a continuous feed/supply of lubricant is provided to the system 200) or may be replaced/supplied on demand or periodically as needed. The lubrication system 200 provides an MQL system for the shredding module 102 to save on the amount of lubricant consumed and the cost thereof, and accordingly reduces the risk of furnace ignition as compared with conventional lubrication techniques. Additionally, the lubrication system 200 facilitates more uniformly lubricating the knives 116 and fingers 118 through the dedicated lubricating channels 202 and distribution of outlet openings 214, thereby reducing wear and degradation of the shredding components (e.g., knives 116 and fingers 118). The improved lubrication of the shredding components also leads to reduced degradation of the drive assembly (e.g., gears), owing to reduced resistance and torque on the shredding shafts 108.

FIGS. 15-18 illustrate a shredder lubrication system 300 according to another example. The shredder lubrication system 300 utilizes lubricant (e.g., air, oil, water, or a combination thereof) that is delivered through the shredding shafts 108 to lubricate the knife 116 and finger 118 interface to help eliminate material galling and keep shredder components cool. The shredder lubrication system 300 may be used alternatively to or in conjunction with the shredder lubrication system 200 of FIG. 14.

Figure 15:
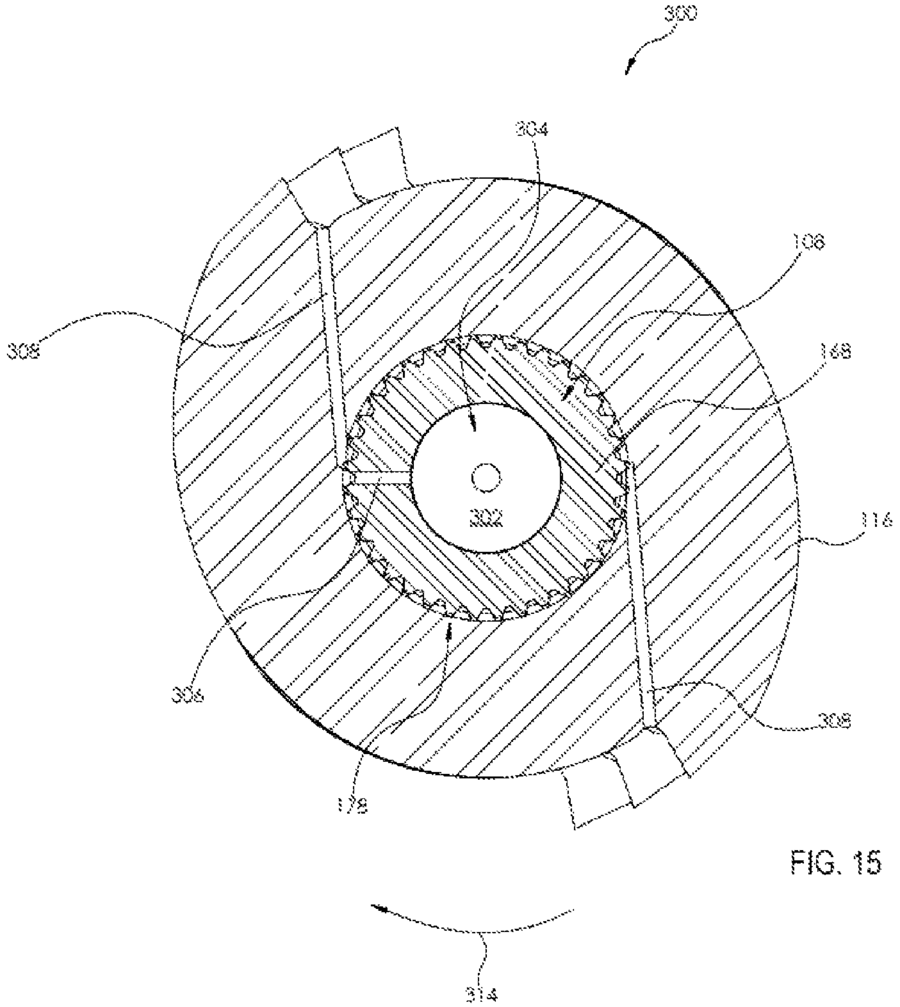
FIG. 15 illustrates a cross-sectional view of a shredding shaft showing a shredder lubrication system according to another example.

Referring to FIG. 15, at least one of the shredding shafts 108 of the shredder lubrication system 300 comprises a hollow, preferably splined, shaft tube 168 defining a hollow interior 302 that provides a central lubrication delivery channel 304 and a plurality of openings 306 arranged along the shaft 168 configured to enable lubricant to flow therethrough to lubricate the shredding components (e.g., knives 116 and fingers 118). The openings 306 may open into the hub 178 of one or more shredding knives 116 and communicate lubricant to a knife lubricating channel 308 of the associated shredding knife 116. Each of the openings 306 may open directly into an inner/interior side (e.g., inlet) of the knife lubricating channel 308 to facilitate transferring the lubricant supply from the central lubrication delivery channel 304 to the knife lubricating channel 308. The illustrated example shows only one opening 306 per shredding knife 116, so that the number of openings 306 match the number of shredding knives 116 even if the shredding knife is provided with multiple knife lubricating channels 308. However, it will be appreciated that the shaft tube 168 may be provided with a number of openings 306 corresponding to the number of knife lubricating channels 308 without departing from the scope of the disclosure (e.g., two (2) openings 306 per shredding knife 116 in FIG. 15). Further, although only one shredding shaft 108 is shown, it will be appreciated that both or all shredding shafts 108 of the shredder apparatus 100 may comprise such a lubrication system 300.

Figure 16:
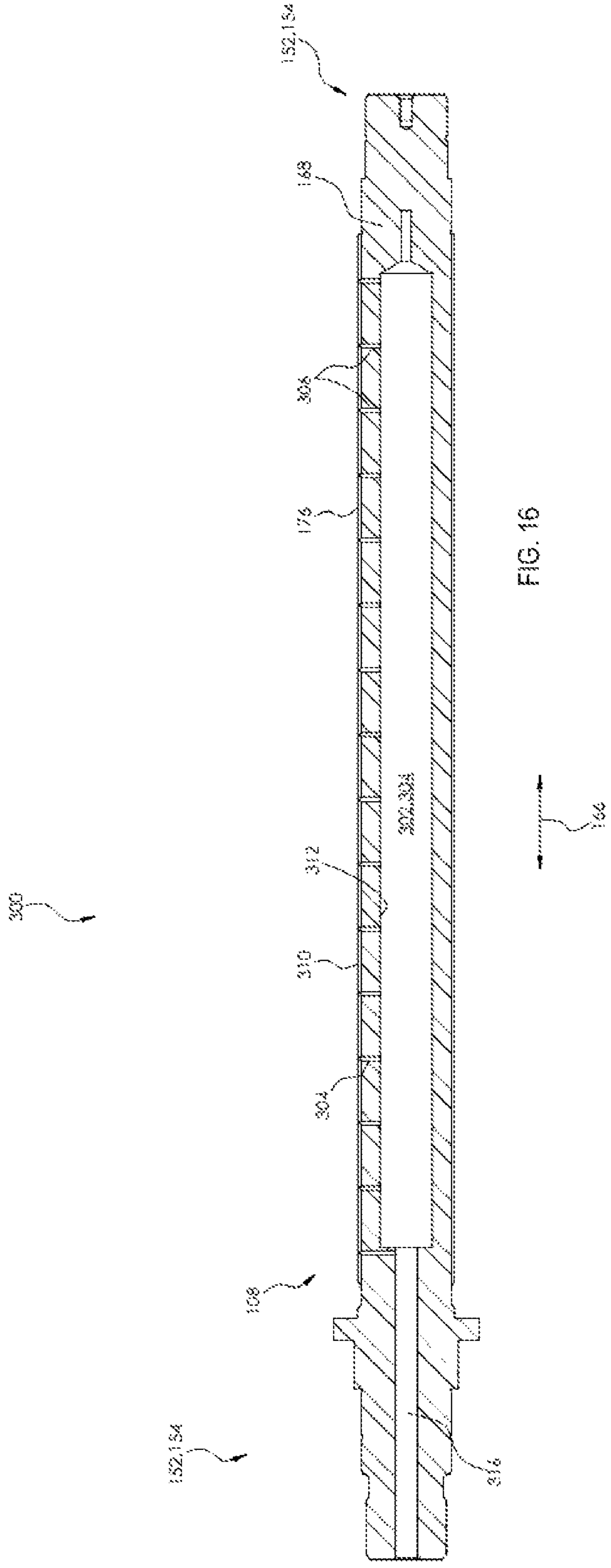
FIG. 16 illustrates a cross-sectional view of the shredding shaft of FIG. 15 with the shredding knives removed.

With reference to FIG. 16, the openings 306 are disposed on/in the hollow shaft tube 168 and extend from an outer surface 310 to an inner surface 312 defining the hollow interior 302 and accordingly to the central lubrication delivery channel 304. The openings 306 may be arranged in a helical pattern along the shaft tube 168 and rotated at predefined increments corresponding to the clocking degree of the shredding knives 116 (e.g., the openings 306 are rotated at 10 degree increments along the shaft tube 168). Alternatively, the openings 306 may be arranged in a straight path extending in the axial direction 166 along the shaft tube 168, and a circumferential groove (not shown) may be provided along the outer surface 310 that extends through the external splines 176 in a circumferential direction 314 in a region of the openings 306 to provide a circumferentially extending lubrication path extending through the external splines 176 of the shaft tube 168 and the internal splines 180 in the hub 178 of the shredding knives 116 (see FIG. 17). The circumferentially extending lubrication path allows lubricant to flow from the respective openings 306 to the mouth or inlet of the associated knife lubricating channel 308 that is rotated at the predefined angular increment from the opening 306 (e.g., rotated by 10 degrees, 20 degrees, 30 degrees, etc.).

The central lubrication delivery channel 304 is formed by the inner surface 312 of the hollow shaft tube 168 defining the hollow interior 302 and extends along the axial direction 166 of the shaft tube 168. At a longitudinal end 152, 154 of the shaft tube 168, a lubricant supply inlet 316 may be provided to permit lubricant to be delivered to the central lubrication delivery channel 304. The lubricant supply inlet 316 may communicate with a lubricant source (not shown) such as a lubricant tube threaded through the associated drive module 110.

Figure 18:
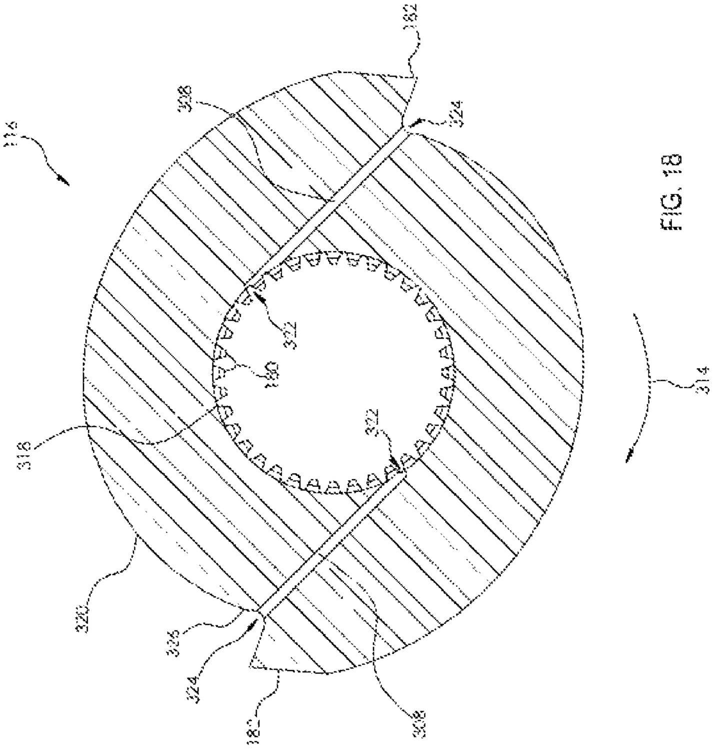
FIG. 18 shows a cross-sectional view of the shredding knife of FIG. 17.
Figure 17:
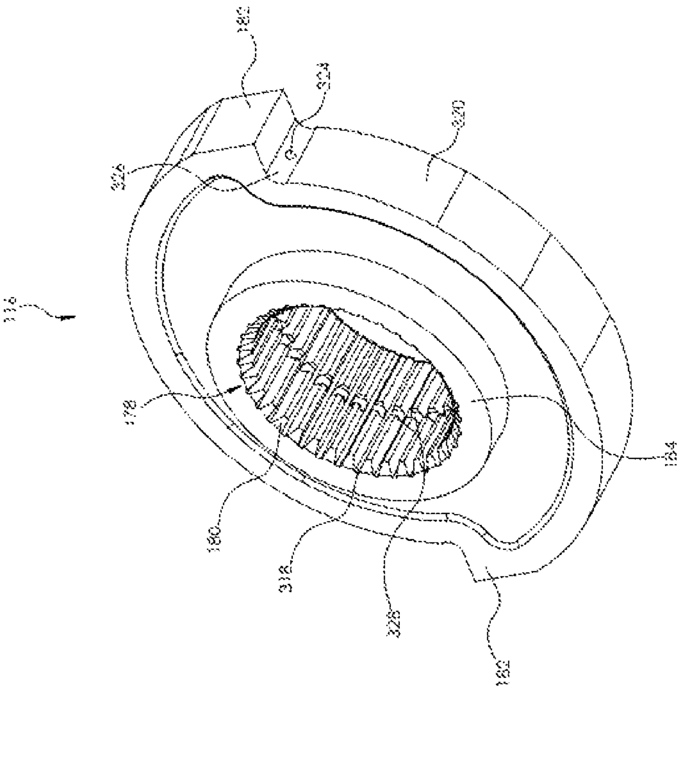
FIG. 17 shows a perspective view of a shredding knife of the shredding shaft of FIG. 15.

Referring to FIGS. 17-18, the shredding knives 116 include at least one knife lubricating channel 308, and in the illustrated example two knife lubricating channels 308, extending from an inner surface 318 of the hub 178 to a radially outer surface 320. The knife lubricating channel 308 has a mouth or inlet 322 opening into the inner surface 318, and an outlet 324 opening to the outer surface 320, wherein the inlet 322 may be arranged circumferentially offset from the outlet 324 (e.g., the outlet 324 is arranged in front of, or leading, the inlet 322 relative to the direction of rotation) to facilitate a controlled or metered flow of lubricant during rotation. The outlet 324 may be arranged at a base 326 of the knife blade 182 so that the knife lubricating channel 308 opens at the blade 182 to deliver lubricant to the highly loaded area of the shredding shaft 108. The inlet 322 of the knife lubricating channel 308 may be arranged at the inner surface 318 between adjacent internal splines 180. Additionally, a lubricating groove 328 may extend through the internal splines 180 in the circumferential direction 314 to provide, together with a corresponding lubricating groove in the external splines 176, a circumferentially extending lubrication path that allows lubricant to flow from the respective openings 306 to the inlet 322 of the associated knife lubricating channel 308. The lubricating groove 328 is particularly advantageous for implementations where the opening 306 is rotated or offset from the inlet 322 of the corresponding knife lubricating channel 308, and/or for implementations where only one (1) opening 306 is provided per shredding knife 116 that comprises two or more knife lubricating channels 308.

Although the knife lubricating channel 308 is shown extending from the inner surface 318 of the hub 178 to the radially outer surface 320 of the shredding knife 116, it will be appreciated that the knife lubricating channel 308 may instead extend from the inner surface 318 of the hub 178 to an outer surface (e.g., outer diameter) of the hub 178 (e.g., through the spacer 184) without departing from the scope of the disclosure.

During operation of the shredder lubrication system 300, a supply of lubrication (e.g., air, oil, water, or a combination thereof) is provided from the lubricant supply inlet 316, e.g., via a lubricating tube coupled thereto acting as a source, to the central lubrication delivery channel 304 wherein the lubricant is distributed to the plurality of openings 306 arranged along the shaft tube 168. The lubricant is communicated from the openings 306 to the knife lubricating channel(s) 308 of the plurality of knives 116, where the lubricant exits the outlet 324 thereof in a region of the blade 182 at the knife/finger interface to lubricate the shredding components (e.g., knives 116 and fingers 118), thereby reducing wear and degradation thereof. The lubricant may be communicated from the central lubrication delivery channel 304 directly to the knife lubricating channel 308 where the opening 306 at the outer surface 310 of the shaft tube 168 is aligned with the inlet 322 of the knife lubricating channel 308, or the lubricant may travel through the lubricating groove 328 formed in the splines 176, 180 along the circumferentially extending lubrication path between the shaft tube 168 and the hub 178 of the shredding knives 116 when the opening 306 is rotated or offset from the inlet 322 of the knife lubricating channel 308. The lubricant that exits the knife lubricating channel 308 is applied to the waste material (e.g., metal scrap) to reduce galling. The lubricant may be replaced/supplied continuously (e.g., a continuous feed/supply of lubricant is provided to the system 300) or may be replaced/supplied on demand or periodically as needed. The lubrication system 300 provides an MQL system for the shredding module 102 to save on the amount of lubricant consumed and the cost thereof, and accordingly reduces the risk of furnace ignition as compared with conventional lubrication techniques.

It will be appreciated that the aforementioned, apparatus 100, system 200, 300 and/or method may be modified to have some components and steps removed, or may have additional components and steps added, all of which are deemed to be within the spirit of the present disclosure. For example, while the guide tracks 144 on the two side walls 140, 142 of the shredder cassette 104 are described as grooves, it will be appreciated that the grooves of the guide tracks 144 may be disposed on side plates 186, 188 of the shredder cassette receiver 106 and the cam followers 194 are disposed on the side walls 140, 142 of the shredder cassette 104. As another example, although the shaft tube 168 has been described as splined, it will be appreciated that the shaft tube 168 may have a hexagonal outer profile that engages with a hexagonal inner profile of the hub 178 of the shredding knives 116 without departing from the scope of the disclosure. Accordingly, even though the present disclosure has been described in detail with reference to specific examples, it will be appreciated that the various modifications and changes can be made to these examples without departing from the scope of the present disclosure as set forth in the claims. It is anticipated and intended that future developments will occur in the technologies discussed herein, and that the disclosed method, device and/or article will be incorporated into such future developments. Thus, the specification and the drawings are to be regarded as an illustrative thought instead of merely restrictive thought.

As used herein, spatial or directional terms such as "top," "bottom," "upper," "lower," "up," "down," "left," "right," "first," "second," "third," and the like, relate to the illustrations shown in the figures and are not to be considered as limiting. Further, all numbers expressing dimensions, ratios and the like, used in the specification and claims, are to be understood to encompass tolerances and other deviations as represented by the term "about" or "approximately." Moreover, all ranges disclosed herein are to be understood to encompass any and all sub-ranges subsumed therein.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of "at least one of" is intended to be inclusive, analogous to the term and/or. Additionally, use of adjectives such as first, second, etc. should be read to be interchangeable unless a claim recites an explicit limitation to the contrary.

What is claimed is:

1. A shredding module, comprising:

a shredder cassette receiver;

a shredder cassette received within the shredder cassette receiver;

the shredder cassette including two shredding shafts arranged in parallel and rotatable about respective rotation axes, and two sets of fingers configured to cooperate with the two shredding shafts to shred material;

the shredder cassette further including a front end plate and a rear end plate that rotatably mount the two shredding shafts;

wherein the shredder cassette is slidably movable in an axial direction of the respective rotation axes into and out of the shredder cassette receiver; and a front drive module having a front mounting plate mounted to the front end plate of the shredder cassette;

wherein the shredder cassette receiver includes a bore and a safety pin arranged in the bore, wherein the safety pin slidably engages into a groove on a radially outer surface of the shredder cassette to stop the shredder cassette at a predefined draw-out distance in the axial direction, wherein the groove extends partially along the radially outer surface of the shredder cassette in the axial direction from the front end plate towards the rear end plate; and wherein the front mounting plate, the front end plate of the shredder cassette, and the shredder cassette receiver are structured and arranged to be connected by bolts threaded through the front mounting plate and the front end plate and connected to the shredder cassette receiver.

2. The shredding module of claim 1, wherein the shredder cassette includes at least one guide track on the radially outer surface configured to interact with at least one slide projection disposed on the shredder cassette receiver.

3. The shredding module of claim 2, wherein the shredder cassette includes a housing and the at least one guide track extends in the axial direction along a radially outer side of the housing.

4. The shredding module of claim 1, further comprising a rear mounting plate for a rear drive module, wherein the rear mounting plate is fastened to the shredder cassette receiver and not the rear end plate of the shredder cassette.

5. The shredding module of claim 1, wherein the front end plate is larger in cross section than the rear end plate.

6. The shredding module of claim 5, wherein of the front end plate has positioning aids for aligning the front mounting plate relative to the shredder cassette.

7. The shredding module of claim 1, wherein the two sets of fingers are detachably coupled to the shredder cassette.

8. The shredding module of claim 1, wherein the two shredding shafts each include a splined shaft and a plurality of disc-shaped shredding knives indexed at predefined increments along the splined shaft.

9. The shredding module of claim 8, wherein at least one of the plurality of disc-shaped shredding knives comprises an integrated spacer protruding in the axial direction.

10. A shredder apparatus, comprising:

an upper supply housing;

a lower discharge duct;

a shredding module including a shredder cassette and a shredder cassette receiver, the shredder cassette receiver connected to the upper supply housing and the lower discharge duct;

the shredder cassette including two shredding shafts arranged in parallel and rotatable about respective rotation axes;

wherein the shredder cassette is axially movable relative to the respective rotation axes into and out of the shredder cassette receiver; and the shredder cassette further including a first end plate and a second end plate that mount a first longitudinal end and a second longitudinal end of the two shredding shafts, respectively;

a front drive module having a mounting plate mounted to the first end plate of the shredder cassette;

wherein the shredder cassette receiver includes a bore and a safety pin arranged in the bore, wherein the safety pin slidably engages into a groove on a radially outer surface of the shredder cassette to stop the shredder cassette at a predefined draw-out distance in an axial direction of the respective rotation axes, the groove extending partially along the radially outer surface of the shredder cassette in the axial direction from the first end plate of the shredder cassette towards the rear end plate of the shredder cassette; and wherein the mounting plate of the front drive module is connectable to the shredder cassette receiver by bolts being threaded through the mounting plate and the first end plate and connected to the shredder cassette receiver.

11. The shredder apparatus of claim 10, wherein the shredder cassette further includes two side walls that interconnect the first end plate and the second end plate.

12. The shredder apparatus of claim 11, wherein the shredder cassette includes a first set of fingers removably coupled to a first of the two side walls and configured to interact with one of the two shredding shafts, and a second set of fingers removably coupled to a second of the two side walls and configured to interact with the other of the two shredding shafts.

13. The shredder apparatus of claim 11, wherein the shredder cassette includes at least one guide track disposed on the radially outer surface of at least one of the two side walls, the at least one guide track configured to interact with at least one cam follower disposed on the shredder cassette receiver.

14. The shredder apparatus of claim 11, wherein the groove extends partially along the radially outer surface of the shredder cassette in the axial direction from a first end plate towards a second end plate of the shredder cassette.

15. The shredder apparatus of claim 10, wherein the first end plate and the second end plate define semi-circular openings, and wherein the shredder cassette further includes a first bearing block and a second bearing block defining corresponding semi- circular openings that are positioned above and aligned with the semi-circular openings of the first end plate and the second end plate.

16. The shredder apparatus of claim 10, further comprising a rear drive module having a mounting plate mounted to the shredder cassette receiver, the mounting plate of the rear drive module being directly connected to a housing of the shredder cassette receiver.

17. The shredder apparatus of claim 10, wherein at least one of the two shredding shafts includes at least one shredding knife with an integrated spacer disposed at a hub of the at least one shredding knife.

18. The shredder apparatus of claim 10, wherein the two shredding shafts comprise a splined hollow tube and a plurality of shredding knives clocked at 10 degree increments.

19. The shredder apparatus of claim 18, wherein the splined hollow tube includes a radially projecting stop collar, and wherein the plurality of shredding knives are axially tensioned against the stop collar by a retaining ring.

20. The shredder apparatus of claim 10, wherein the first end plate has positioning aids for aligning the front mounting plate relative to the shredder cassette.

* * * * *